May 19, 1970 J. E. FROST 3,512,296
BODY-HOLD ANIMAL TRAP
Filed July 25, 1968
2 Sheets-Sheet 1
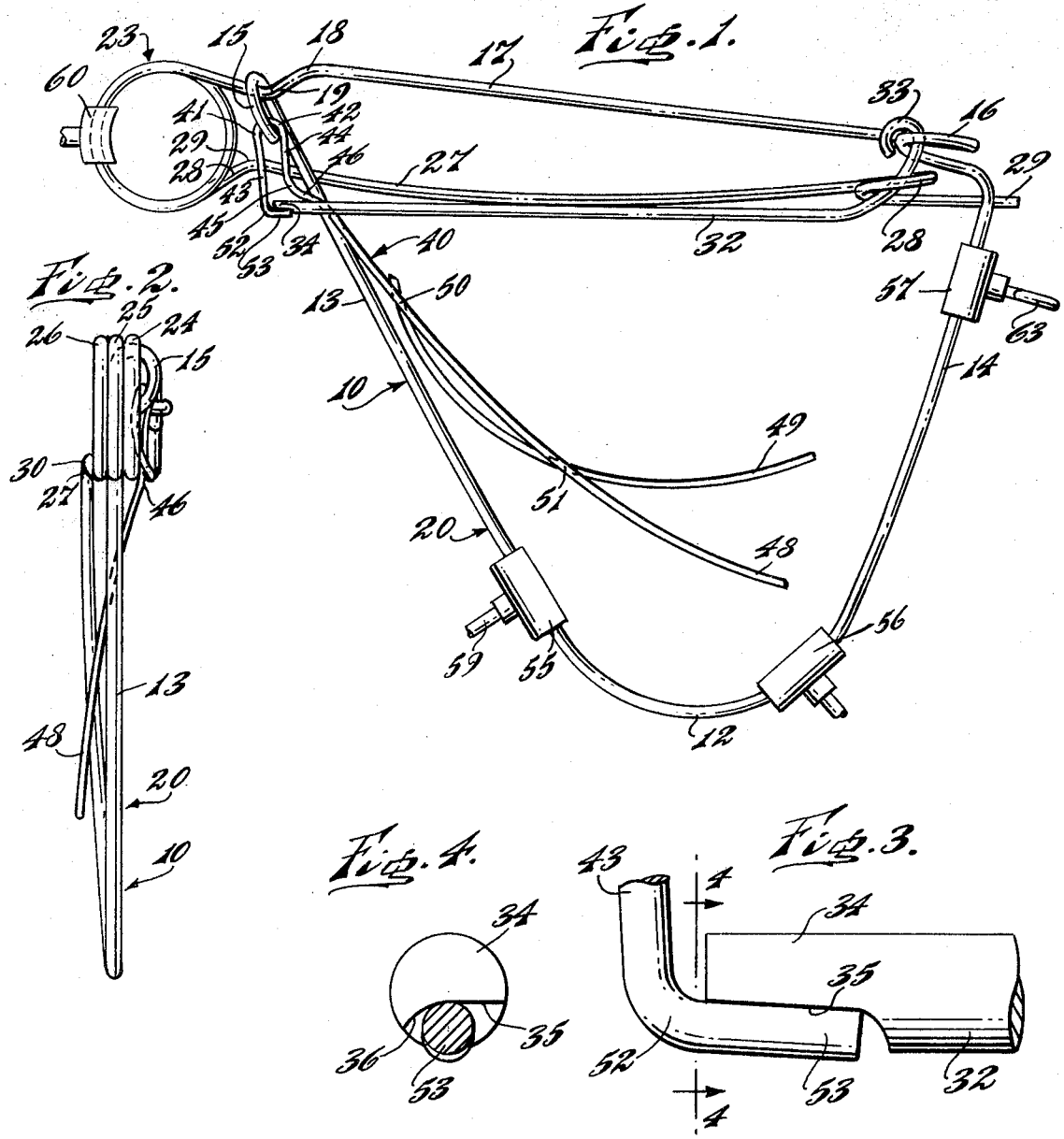
INVENTOR.
John E. Frost
BY Robert K. Youtie
ATTORNEY May 19, 1970   J. E. FROST   3,512,296
BODY-HOLD ANIMAL TRAP
Filed July 25, 1968   2 Sheets-Sheet 2
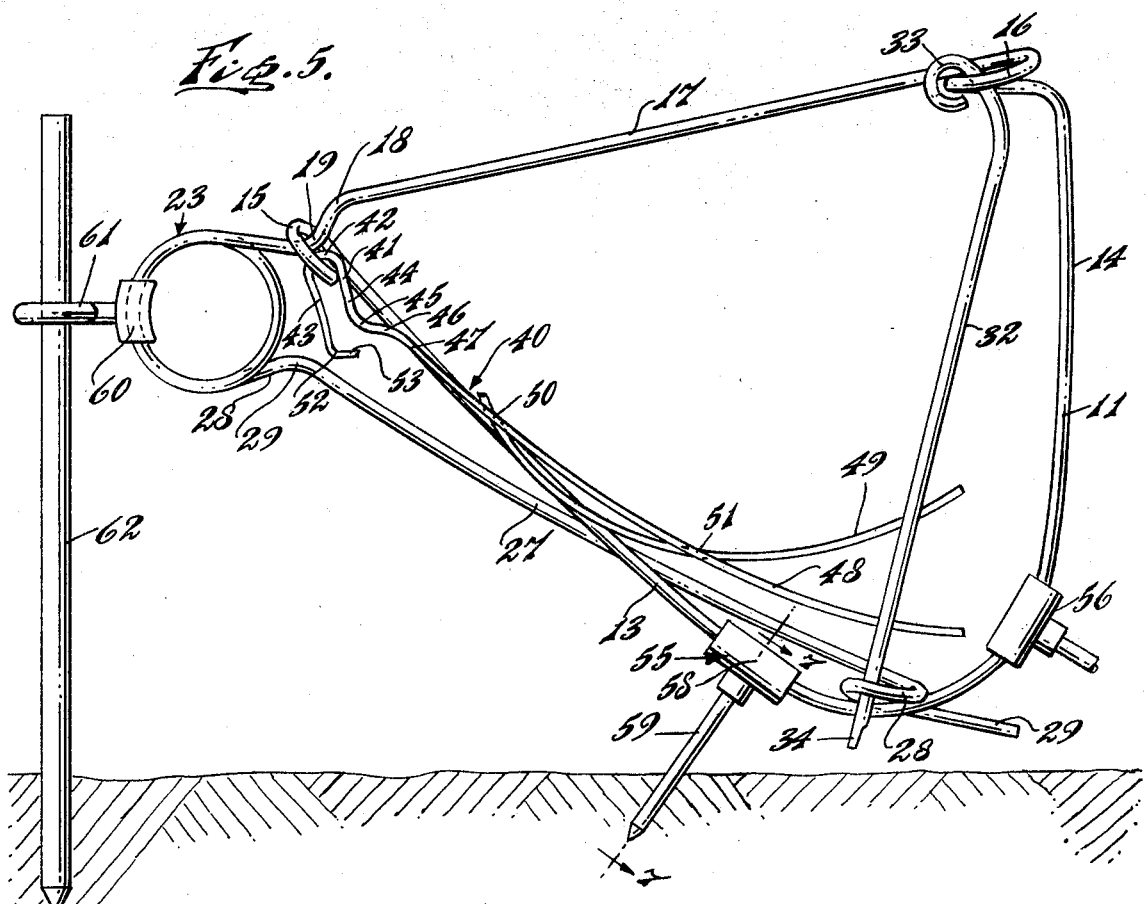
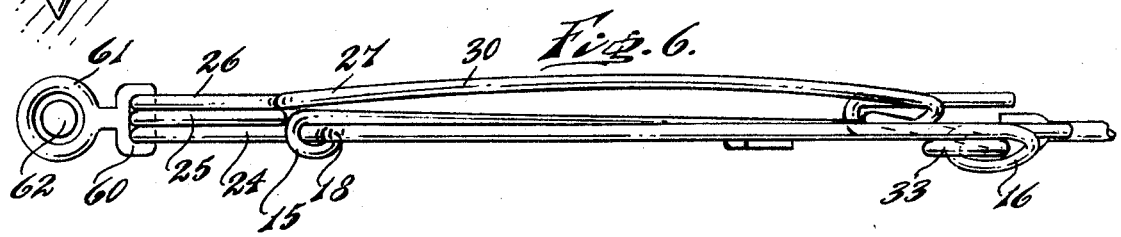
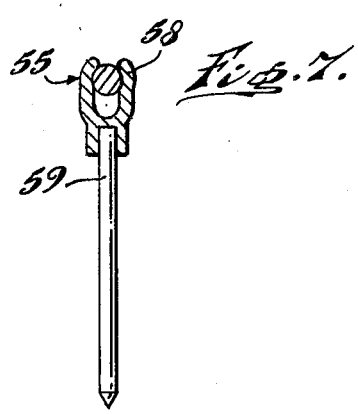
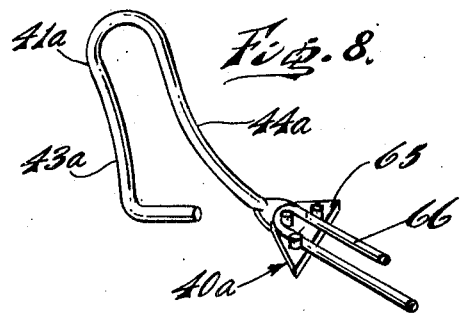
INVENTOR.
John E. Frost
BY Robert K. Youtie
ATTORNEY

United States Patent Office 3,512,296
Patented May 19, 1970

3,512,296
BODY-HOLD ANIMAL TRAP
John E. Frost, 10 W. Braddock Drive,
Somers Point, N.J. 08244
Filed July 25, 1968, Ser. No. 747,701
Int. Cl. A01m 23/30
U.S. Cl. 43—85                                       8 Claims

ABSTRACT OF THE DISCLOSURE

A trap having an open frame, a holding arm freely swingable on the frame, a spring arm slidably connected to the holding arm for resiliently urging the latter to a released position, and a trigger for releasably retaining the holding arm in a set position against the resilient force of the spring arm.

BACKGROUND OF THE INVENTION

While there have been proposed a wide variety of animal traps, such traps have often been relatively complex and difficult to manufacture, lacking versatility for satisfactory use under widely varying conditions, not entirely reliable in springing and holding an animal, and sometimes difficult to use.

SUMMARY

Accordingly, it is an important object of the present invention to provide an animal trap of the type described which overcomes the above-mentioned difficulties, is extremely simple in structure, entirely reliable throughout a long useful life, capable of being quickly and easily set and positioned under a great variety of actual conditions of use, and which is safe to the user while highly effective in retaining the animal.

It is a more particular object of the present invention to provide an animal-trap construction having the advantageous characteristics mentioned in the preceding paragraph, which is highly effective in being released or sprung by animals moving in opposite directions along a path or run, and also by downward movement of an animal, as by its foot.

Other objects of the present invention will become apparent upon reading the following specification and referring to the accompanying drawing, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWING

FIG. 1 is an elevational view showing a trap constructed in accordance with the teachings of the present invention, the trap being illustrated in a set condition.

FIG. 2 is a side elevational view of the trap of FIG. 1, as taken from the left side thereof.

FIG. 3 is a fragmentary elevational view similar to FIG. 1, enlarged for clarity.

FIG. 4 is a partial sectional view taken generally along the line 4—4 of FIG. 3.

FIG. 5 is an elevational view similar to FIG. 1, but showing the trap in a released condition.

FIG. 6 is a top plan view of the trap of FIG. 5.

FIG. 7 is a fragmentary sectional view taken generally along the line 7—7 of FIG. 5.

FIG. 8 is a partial elevational view showing a modified form of trigger.

DESCRIPTION OF THE PREFERRED EMBODIMENT

Referring now more particularly to the drawing, and specifically to FIGS. 1 and 2 thereof, a trap of the present invention is there generally designated 10, and may be substantially completely fabricated of wire or rod stock having suitable resilience and rigidity. The trap 10 includes an elongate member of generally U-shaped configuration, designated 11, and referred to hereinafter as a receiving part. The receiving part 11 may include a lower, upwardly concave bight portion 12, and a pair of laterally spaced legs 13 and 14 extending generally upwardly and outwardly from opposite ends of the bight portion. The upper end of leg 13 may be bent to define an eye 15 generally coplanar with the leg 13 and lying in a plane generally normal to that of the U-shaped receiver part 11. The upper end region of receiver-part leg 14 is bent or curled to form a loop or eye 16 lying in a plane normal to both the leg 14 and the plane of the receiver part 11. That is, the eye or loop 16 extends generally normal to the leg 14, from the upper end thereof, toward the leg 13. An integral extension of the eye or loop 16, as by an elongate element 17, extends toward the eye or loop 15, being bent downwardly, as at 18, and passing thence through the eye 15, as by an upwardly bent region 19. As will appear more fully hereinafter, the eye 16, integral extension 17 and receiving eye 15 combine to define a mounting part. In turn, the mounting part 16, 17, 15 combines with the receiving part 11 to define an open frame generally designated 20.

An integral extension of the elongate element 17, as from the bend 19 passing through eye 15, assumes the form of a coiled spring 23 having, say, three convolutions lying in planes generally parallel to that of the frame 20. That is, from the bend 19 of elongate element 17, the coil spring 23 is formed into successive convolutions 24, 25 and 26 toward the rear, as seen in FIGS. 1 and 5. From the lower side of the rearmost convolution 26 of coil spring 23, there is an integral elongate member or extension 27, proceeding upwardly and inwardly toward the frame 20, as at 28, there being bent downwardly, as at 29, and extending thence generally along the elongate member 17. Being integral with the coil spring 23, the member 27 will be understood to define a spring arm, passing on the rear side of the frame 20, as seen in FIG. 1. The spring arm 27 is further formed with a generally horizontal loop or eye 28 located adjacent to the eye 16 in the set position of FIG. 1, and terminates, as at 29 beyond the frame leg 14. Also, as best seen in FIGS. 2 and 6, the spring arm 27 may be bowed outwardly away from the plane of the frame 20, as at 30.

The components thus far described, including the frame 20, coil spring 23 and spring arm 27 are all advantageously formed of a single length of resilient material, such as spring steel, or the like. While these components may be separately fabricated and suitably connected together, the inherent reliability and durability of the device is believed enhanced by the integral formation.

Separate from the hereinbefore described components is an elongate member or holding arm 32, say formed of rod or wire stock, having one end formed by bending into an eye or loop 33 located generally in the plane of the holding arm. The eye or loop 33 receives the eye or loop 16, so that the holding arm 32 may lie on the forward side of the frame 20, and in the set position of FIG. 1 extend generally longitudinally of the spring arm 27 and elongate frame member 17. By this construction, the holding arm 32 is swingable between its set position of FIG. 1 adjacent to the mounting part 16, 17, 15 and a released position, see FIG. 5, extending toward the bight region 12 away from the mounting part. In the set position of holding arm 32, its free end region 34 is located proximate to and beneath the eye or loop 15. The underside of the free holding-arm end region 34 is notched, cut away or otherwise provided with a bearing surface 35, see FIGS. 3 and 4, which may be generally flat to open forwardly or to the right, and provided with a restraining lip 36 depending from the rearward side of the bearing surface 35, for a purpose appearing presently.

A trigger is generally designated 40, and is also advantageously fabricated of wire stock, including an inverted generally U-shaped portion 41 having its bight region 42 extending loosely through the eye 15. The portion 41 includes a pair of outer and inner depending legs respectively designated 43 and 44. The inner leg 44 is formed with an inward bend 45 from which extends a transverse portion 46 and terminates in a downward bend 47, from which extends an elongate trigger extension 48. In the set condition of FIG. 1, the transverse trigger portion 46 and bend 47 extend across the frame leg 13 on the forward side thereof, being interposed between the latter and the holding arm 32, while the extension 48 extends into the opening of the frame 20. A branch extension 49 may be secured to the extension 48, as by welds at overlapping locations 50 and 51, so that the branch 49 also extends into the opening of frame 20 at an elevation spaced from that of the extension 48.

The outer leg 43 of the inverted U-shaped trigger portion 41 is formed with an inward bend 52, from which extends a terminal portion or catch 53. That is, the catch 53 extends inward from the lower end of outer leg 43, and in the set position of the trap 10 engages with the bearing surface 35 on the underside of the distal region 34 of holding arm 32. This condition is shown in FIGS. 1–4.

One or more staking attachments, as at 55, 56 and 57 may be applied to different parts of the trap 10 for positioning the trap in a suitable manner in accordance with the environment. One such staking attachment is shown in FIG. 7 as including a generally U-shaped clip 58, advantageously of a resilient material, such as plastic, or the like. A stake 59, which may be a pin, nail, twig or otherwise, may extend through the bight region of the U-shaped clip 58 for engagement in a ground surface, log, or other suitable support. The attachment 57 may include a ring or eye 63 carried by a clip, see FIG. 1, for receiving a post or peg. In addition, staking attachment 60 may include a loop interengaged through the several coils of spring 23, and slidable thereon, being provided with an outstanding loop or eye 61, as for receiving a stake 62 impaled in a nether support. In this manner, the trap 10 may be set in a wide variety of positions and under an extreme variation of conditions. Of course, the stake attachments 55, 56 and 57 are selectively locatable as desired on the frame 20, and the stake attachment 60 is angularly shiftable on the coil 23.

In the set condition of FIGS. 1–4, it will be appreciated that downward movement of the trigger extension 48 or branch 49, as by an animal stepping thereon, will swing the trigger catch 53 clockwise beyond the free end of holding arm 32. This releases the holding arm for swinging movement counterclockwise about its pivotal connection by loops 16 and 33 under the force of spring arm 27. The animal is obviously thereby caught between the frame leg 11 and holding arm 32 in the released condition of FIG. 5. Upon animal movement rearwardly, say horizontally into the trigger extension 48 or branch 49, the transverse trigger portion 46 acts as a fulcrum point in its bearing engagement upon the adjacent underlying portion of frame leg 13 to swing the trigger catch 53 forwardly off of the flat side of holding-arm bearing surface 35. This, of course, effects release of the holding arm for movement to its released position under the force of spring arm 27. The rearward bow 30 of spring arm 27 prevents any possible interference between the spring arm and trigger extension 48 or its branch 49 upon rearward movement of the same.

In the case of an animal moving from rear to front through the trap 10, the trigger bears on the rear side of holding arm 32, say the transverse trigger portion 46, and by the mechanical advantage of leverage displaces the holding arm 32 forwardly off of the catch 53. In this condition of operation the depending lip 36 of the holding arm 32 must ride over the catch 53, so that the leverage is effectively reduced. In this manner, the force required to release the holding arm 32 from its set position is approximately equal in both forward and rearward directions of movement against the trigger extension 48 or its branch 49.

In practice, the trigger extension 48 and branch extension 49 may be adjusted by manual bending for advantageous location in the opening of frame 20. Also, the trigger extension and branch may be effectively concealed or camouflaged, as by grass, leaves or the like. Also, the amount of downward movement of the trigger extension 48 or branch 49 may be selectively determined at the setting of the trap, by the positioning of catch 53 more or less inward of the holding-arm end portion 34.

If desired, the distal arm region 34 may be of circular cross-section, and the catch 53 formed with a lip to achieve the generally equal springing force.

The modified trigger 40a of FIG. 8 includes an inverted U-shaped portion 41a having legs 43a and 44a similar to the first described embodiment. However, the leg 44a terminates in an anchor member 65 which may be a plate for detachable securement to a separate replaceable extension wire 66.

While the instant trap has been illustrated in the set position with the frame bight region 12 lowermost, it is appreciated that the trap may be set in a variety of positions, say with leg 11 or leg 13 lowermost, or even the elongate member 17 lowermost, if desired. Also, the shape and size of the opening through frame 20 may be changed, if desired, say for compliance with state laws, or otherwise.

From the foregoing, it is seen that the present invention provides a body-hold animal trap which fully accomplishes its intended objects and is well adapted to meet practical conditions of manufacture and use.

Although the present invention has been described in some detail by way of illustration and example for purposes of clarity of understanding, it is understood that certain changes and modifications may be made within the spirit of the invention.

What is claimed is:

1. An improved body-hold animal trap comprising an animal-receiving part, a mounting part extending across said receiving part, said animal-receiving and mounting parts combining to define a generally planar open frame, an animal holding arm having one end pivotally connected to said mounting part and having its other end free for swinging movement across the opening of said frame between a set position adjacent to said mounting part and a released position extending away from said mounting part, a resilient spring arm having one end resiliently swingably connected to said mounting part at a location spaced from said pivotal connection of said arm and slidably connected to said arm to yieldably urge the latter from its set position toward its released position, a mounting eye on said mounting part generally perpendicular to the plane of said frame, and a trigger mounted for universal movement by said mounting eye adjacent to the free end of said holding arm in the set position of the latter, said trigger comprising an inverted generally U-shaped portion having its bight extending loosely through said mounting eye and having outer and inner depending legs, said outer leg depending beyond the free end of said holding arm in the set position of the latter, a catch extending from said outer leg longitudinally inwardly along and engaging with said holding arm to releasably retain the latter in its set position, said catch being swingable with said U-shaped portion both longitudinally beyond the end of and transversely beyond opposite sides of said holding arm to release the latter, and an extension on said inner leg extending into the opening of said frame for actuation by an animal to move the trigger catch out of its retaining relation with said holding arm to release the latter to engage and hold an animal in said holding part.

2. An animal trap according to claim 1, said holding and spring arms being swingable on opposite sides of said frame and slidably connected together through the opening of said frame.

3. An animal trap according to claim 2, said trigger being swingable in one direction on the outer side of said holding arm and in the other direction on the inner side of said holding arm, said spring arm being bent outwardly for unobstructed movement past said trigger swung in said other direction.

4. An animal trap according to claim 1, said receiving part comprising a loop portion having one side open facing toward said mounting part, and said mounting part extending across the open side of said loop portion.

5. An animal trap according to claim 1, said trigger extension extending inwardly from the inner of said legs across and in bearing engagement with the adjacent portion of said receiving part, whereby said adjacent receiving-part portion defines a fulcrum for said trigger in one generally horizontal direction of trigger movement.

6. An animal trap according to claim 5, said extension extending between said adjacent receiver-part portion and said holding arm, for engaging and releasing the holding arm upon trigger movement in the other generally horizontal direction.

7. An animal trap according to claim 6, said holding arm having a non-symmetrical bearing surface engageable with said catch specifically configured to effectively equalize the force required on said extension in said one and other directions to release said catch.

8. An animal trap according to claim 1, in combination with staking attachments detachably secured at selected locations to said mounting and receiving parts to support the trap in a selected set position.

References Cited

UNITED STATES PATENTS

| | | | |
|---|---|---|---|
| 218,532 | 8/1879 | Hooker | 43—85 |
| 390,021 | 9/1888 | Hooker | 43—85 |
| 734,413 | 7/1903 | Foreman | 43—85 |
| 866,862 | 9/1907 | Hooker | 43—85 |
| 1,596,005 | 8/1926 | Diegel | 43—85 |

WARNER H. CAMP, Primary Examiner